though

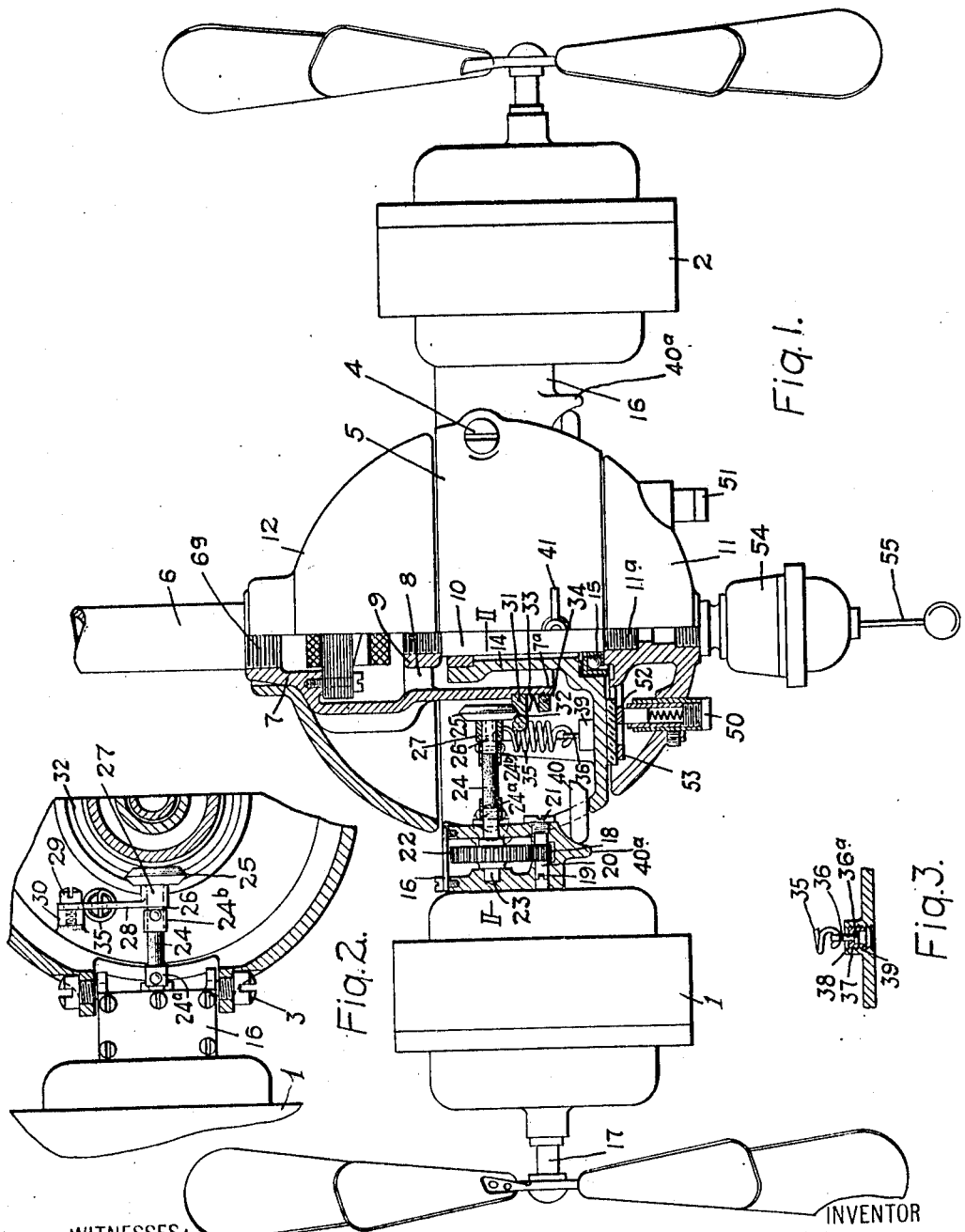

UNITED STATES PATENT OFFICE.

EARL W. DENMAN, OF WILKINSBURG, PENNSYLVANIA, ASSIGNOR TO WESTINGHOUSE ELECTRIC AND MANUFACTURING COMPANY, A CORPORATION OF PENNSYLVANIA.

REVOLVING FAN.

1,270,795.

Specification of Letters Patent.

Patented July 2, 1918.

Application filed January 4, 1916. Serial No. 70,259.

*To all whom it may concern:*

Be it known that I, EARL W. DENMAN, a citizen of the United States, and a resident of Wilkinsburg, in the county of Allegheny and State of Pennsylvania, have invented a new and useful Improvement in Revolving Fans, of which the following is a specification.

My invention relates to revolving fans and especially to gyratory electric fans that are adapted to turn on axes of rotation while simultaneously and automatically turning around external axes of revolution.

One object of my invention is to provide a gyratory fan of simple construction which shall be provided with positively actuated mechanical means for effecting the rotation of the fan support by power derived from the rotating shaft that carries the fan blades.

Another object of my invention is to provide a fan of the above-indicated type which may be readily adjusted to deliver air either horizontally or at various angles of inclination without disengaging the driving mechanism through which the fan structure is revolved.

A further object of my invention is to provide a fan of the above-indicated type in which the positively actuated mechanism is rigidly associated with the fan support and is in frictional engagement with a portion of the stationary hanger or other supporting means around which the fan revolves, whereby the revolution of the fans around their external axes may be temporarily arrested without damaging any of the members or interrupting the driving connection between the fan motors and the stationary support.

In the accompanying drawing, Figure 1 is a view, partially in section and partially in side elevation, of a revolving fan mechanism constructed in accordance with my invention; Fig. 2 is a sectional view along the line II—II of Fig. 1, showing a portion of the fan mechanism, and Fig. 3 is a fragmentary sectional view of a detail of the fan mechanism.

The fan structure comprises fan motors 1 and 2 which are pivotally supported at 3 and 4 upon opposite sides of a bracket 5 that is rotatably suspended from a hanger rod 6. The hanger rod 6 is provided with a threaded portion 6ª to which is attached a cylindrical member 7 that is provided with inwardly extending arms 8 to support an internally threaded annular member 9 which is engaged by the corresponding threaded upper end of a vertical shaft 10. The lower end of the shaft 10 is also threaded and engages a threaded recess 11ª in a bottom casing member 11, the exterior of which is spherically curved. The outside of the bracket 5 is also spherically curved to correspond to the bottom casing member 11, and a spherically curved hood 12 is located above the bracket 5 and rests upon a shoulder formed upon the member 7. The members 5, 11 and 12 thus compose a generally spherical structure. The bracket 5 is provided with an upwardly extending sleeve 14 that surrounds the shaft 10 and is rotatably supported in ball bearings 15 that are located in a suitable ball-race between the sleeve 14 and the bottom casing member 11.

As the fan motors 1 and 2 may be of any desired type, their structural details will not be described. A gear-box 16, that is secured to the rear end-bell of the fan motor 1, contains the mechanism for driving the bracket around its support by means of power derived from the armature shaft 17 of the motor. The driving mechanism comprises a pinion 18 that is secured to the armature shaft 17 by any suitable means, such, as coöperating clutch teeth 19 that are provided, respectively, on abutting ends of the shaft 17 and a short shaft 20 upon which the pinion 18 is keyed. The clutch teeth 19 are maintained in engagement with each other by means of a plug 21 in a threaded opening in the wall of the gear box 16. The pinion 18 meshes with a gear wheel 22 that is mounted on a short shaft 23 which is supported by the walls of the gear box. The shaft 23 projects, at one end, beyond the wall of the gear box 16 and is secured to a flexible shaft 24 by means of a suitable coupling 24ª. A friction wheel 25 is mounted on a shaft 26 that is secured to the other end of the flexible shaft 24 by means of a coupling 24ᵇ. The shaft 26 is rotatably mounted in a bearing 27 that is carried at one end of an arm 28. The arm 28 is pivotally supported, at its other end, by means of a pin 29 in threaded engagement with a lug 30 provided on the wall of the bracket 5. The lower end of the member 7 is provided with a reduced portion 7a upon which is mounted a ring 31 that is provided with an annular groove 32. The ring 31 is normally maintained in engagement with the shoulder formed by the reduced portion 7a by means of an annular double-concave spring 33 which is maintained under any desired degree of compression by means of a nut 34 that engages screw threads on the lower end of the member 7. The friction wheel 25 is adapted to run within the groove 32, and the engaging surfaces of the wheel and groove, respectively, are preferably faced with a material having a high coefficient of friction, such as leather.

The friction wheel 25 is maintained in engagement with the groove 32 by means of a tension spring 35 that is secured, at one end, to the arm 28 at a point intermediate the pin 29 and the bearing 27. The lower end of the spring 35 is adjustably secured to the base of the bracket 5. As best shown in Fig. 3, the end of the spring 35 is secured to a pin 36 that is provided with a head 36a. A hollow, externally-threaded plug 37 is provided, at one end, with a shoulder 38 that engages the head 36a of the pin 36, while the remainder of the pin projects beyond the end of the plug 37. The plug 37 is screwed into an internally-threaded projection 39 that is provided on the base of the bracket 5. The tension of the spring 35 may be regulated by altering the position of the threaded plug 35 with respect to the projection 39.

From the foregoing, it is evident that the rotation of the armature shaft 17 will be transmitted through the pinion 18, the gear wheel 22 and the flexible shaft 24 to the friction wheel 25 and that the engagement of the friction wheel 25 with the groove 32 will turn the bracket 5 and the fan motors 1 and 2 around the axis of the hanger 6. The speed of revolution may be changed by changing the relative diameters of the pinion and the gear wheel. The degree of frictional engagement between the wheel 25 and the groove 32 may be varied by adjusting the tension of the spring 35. If the rotation of the bracket 5 should be arrested, the fan motors would continue to rotate by reason of the yielding attachment between the ring 31 and the member 7, the ring 31 being permitted to rotate relatively to the member 7 if sufficient power is applied to it to overcome the frictional force exerted by the spring 33.

The fan motors 1 and 2 are loosely mounted upon their respective pivots 3 and 4 and may be maintained at predetermined equal inclinations by means of reciprocal members one of which is shown at 40, the outer ends of which are rounded to engage rounded portions 40a of the fan motor casings. These adjusting members may conveniently be operated in unison by means of an adjusting nut 41 through link mechanism, such as is described and claimed in a copending application of Oliver S. Jennings, Serial No. 791, filed January 6, 1915, and assigned to the Westinghouse Electric & Manufacturing Company. It is evident that the fan motors may be maintained at any desired degree of inclination without disturbing the driving mechanism by reason of the flexible shaft connecting the reduction gearing and the members that are in frictional engagement. It is to be understood, however, that any other well known form of flexible driving connection may be employed between the shaft 23 and the friction wheel 25, such, for example, as universal joints connected by members in sliding engagement.

Energy may be supplied to the fan motors 1 and 2 in any convenient manner by means contained in brush holders 50 and 51 and engaging slip rings 52 and 53. The electric current may be controlled by a switching device 54 and an operating chain or cord 55. The conductors supplying energy to the brushes from the slip rings to the fan motors may be arranged in any convenient manner, not shown on the drawing.

When the fan motors are positioned with the axes of their shafts horizontal, revolution of the hanger is produced solely by power transmitted through the reduction gearing and the frictional elements. When, however, the fans are tilted either upwardly or downwardly, the well known "paddle wheel" action of the fan blades will either assist or retard the driving effect of this mechanism, depending upon the direction of tilt, the direction of rotation of the fan blades and the consequent direction in which the torque is exerted. This torque may, in some cases, be sufficient to rotate the bracket. In such case, no driving power is transmitted by the gear and frictional members, which then perform the function of a speed regulator only by maintaining a fixed speed ratio between the fan blades and the bracket in accordance with the amount of frictional engagement, as determined by the tension of the adjusting spring.

While I have shown my invention as applied to a particular type of fan structure, it is not so limited but is susceptible of various modifications within the scope of the appended claims.

I claim as my invention:

1. The combination with a rotatable support, of a motor pivotally mounted thereon, reduction gearing carried by said motor and driven thereby, a flexible coupling device, and relatively movable members in adjustable frictional engagement operatively connected to said gearing through said flexible coupling device for rotating said support, whereby the angular positions of the said motor and gearing around the motor pivot may be adjusted without affecting the frictional engagement of the said members.

2. The combination with a rotatable support, of a motor mounted thereon, relatively stationary means for supporting the said rotatable support, reduction gearing driven by said motor and rigidly carried by said rotatable support, a member carried by said stationary support, and a second pivotally mounted member in frictional engagement with said first-named member and flexibly connected to said reduction gearing for rotating the said rotatable support.

3. The combination with a rotatable support, of a motor mounted thereon, relatively stationary means for supporting the said rotatable support, reduction gearing driven by said motor and rigidly carried by said rotatable support, a flexible coupling mechanically associated with said reduction gearing, a member carried by said stationary support, and a second member in adjustable frictional engagement with said first-named member and connected to said reduction gearing by said flexible coupling device for rotating the said rotatable support.

4. The combination with a rotatable support, of a motor mounted thereon, relatively stationary means for supporting the said rotatable support, reduction gearing driven by said motor and rigidly carried by said rotatable support, a member carried by said stationary support, and a second pivotally mounted member in adjustable frictional engagement with said first-named member and flexibly connected to said reduction gearing for rotating the said rotatable support.

In testimony whereof I have hereunto subscribed my name this 28th day of Dec., 1915.

EARL W. DENMAN.

Copies of this patent may be obtained for five cents each, by addressing the "Commissioner of Patents, Washington, D. C."